Patented Nov. 20, 1945

2,389,465

UNITED STATES PATENT OFFICE 2,389,465

COMPOSITION FOR STORAGE BATTERY PLATES AND METHOD OF PREPARING SAME

Alexander Stewart, Mountain Lakes, N. J., and Adrian R. Pitrot, Hempstead, N. Y., assignors to National Lead Company, New York, N. Y., a corporation of New Jersey No Drawing. Application September 25, 1941, Serial No. 412,284

7 Claims. (Cl. 136—26)

This invention relates to storage batteries of the lead-acid type and has for its object an improvement in the capacity of such batteries.

Specifically, this invention relates to a new "expander" material recovered from waste liquors of the sulfate or soda processes for pulping wood which when incorporated in the active material of the negative plate of the lead-acid storage battery, will result in a battery of improved capacity especially at low temperatures and at high discharge rates.

The prior art has shown that when a small percentage of a certain class of substances, generally classified as humins, humic acids, ulmins, ulmic acids, lignins or ligneous materials and derived from vegetable matter either in the undecomposed state as in woods, corncobs, straw, and the like, or in a partially decomposed state as in muck, peat, lignites, compost, tanbark, and the like, are added to the oxide composition used in preparing negative storage battery plates, the resultant capacity of the battery, especially at high rates of discharge, is markedly improved.

Such vegetable matter as has been used for the source of the expander material has been extracted for the active fraction by numerous means. The prior art has shown a progressive improvement in battery performance as a result of improved methods in the manner of preparation of the expander material.

Thus, the prior art has disclosed that the addition of specially treated waste sulfite liquors obtained as a by-product of paper mills using this process, might be used for the purpose of improving the low temperature capacity of lead storage batteries. We have now found that certain chemical products may be obtained from the waste liquors of the soda or kraft processes for making pulp and that these products can also be used to increase the initial capacity as well as the sustained low temperature capacity during the life of the battery.

Sulfite liquor is distinguished from the soda or kraft liquors in its chemical composition. Sulfite liquor is a waste product from paper mills wherein wood chips are digested under pressure with a solution of calcium bisulfite. In this process the bisulfite liquor dissolves the ligneous portion of the wood, resulting in two fractions, (1) the cellulose pulp from which paper and other products are made and (2) the waste sulfite liquor. Organic matter may be precipitated from the waste sulfite liquors by treatment with caustic lime to give battery expander materials such as lignin or sulfonic derivatives of lignin which products have been formerly used in the negative plates of storage batteries.

On the other hand, the waste soda liquors resulting from the manufacture of pulp by the so-called soda or kraft processes, namely, "black liquors," are the raw products used in carrying out our invention. In the soda process, chips of wood are treated with a solution of sodium hydrate. The kraft process differs from the soda process chiefly in the fact that sodium sulfide is used in addition to sodium hydrate in the digesting liquor. The pulping of the chips in both processes is performed in closed steel tanks or digestors under steam pressure. When the wood is properly digested, the charge is emptied into wash tanks where the cellulose fiber is washed free from the liquor solution or the so-called "black liquor." This black liquor is concentrated in evaporators, the residue from which comes out as a black semi-solid material called "black ash." Either the black liquor or the black ash may be used as the raw material for the preparation of our improved storage battery expander. As will be understood by those skilled in the art, the alkalinity of this black liquor or black ash is so strong that it cannot be determined or expressed in pH values.

The composition of the black ash varies somewhat and is dependent upon a number of factors which include the type of wood used, conditions of digesting and the like, but on the average will contain about 50% organic matter.

In general, the preparation of the material to be used may be carried out in accordance with the following procedure. The black ash is dissolved in water in a ratio of about one part solids to about four parts water, or the black ash may be dissolved in waste black liquor to give the same solid content, or the waste black liquor may be adjusted to approximate this concentration either by dilution or evaporation as the case may be. From this solution a fraction of the organic matter present is precipitated by lowering the alkalinity of the solution. This may be accomplished by the addition of an acid or an acidic material, e. g. hydrochloric acid, an acid salt, e. g. potassium acid sulfate, or a salt giving an acid hydrolysis, e. g. ammonium sulfate, until the pH of the solution is between 10.0 to 7.0, but not below 7.0. In this manner a fraction of the available organic matter present in the liquor varying from about 30 to about 80% of the total, is precipitated. Following this precipitation, the material is coagulated or collected by heating the entire system to a temperature of between about 60° C. and about 100° C. The precipitate is filtered and washed free of soluble materials by means of water to which has been added a small amount of acidic material, usually that employed in the precipitation. If, however, the acidic material used in the precipitation is of such a nature as to be deleterious or injurious to the finished storage battery, then a different agent may be used in washing such as dilute sulfuric acid. The washed filter cake is dried and pulverized and is now ready for use as an expander material to be added to the lead compound for the negative plates of storage batteries.

While the exact nature of the organic material resulting from the above process is not clearly understood, it is of a ligneous nature. Preliminary work had indicated that the organic material existing in the waste black liquor from the soda or kraft processes would be suitable as an expander. However, considerable experimental work and the production of many test batteries showed that the entire organic fraction gave inconsistent results. While some samples of waste black liquors were obtained which on precipitation by an acid gave a product of desirable properties, when incorporated in a storage battery, other samples given the identical treatment produced a product which was decidedly inferior. This difference in behavior remained inexplicable over a period of time during which continued investigation was made.

We subsequently discovered, however, that if we precipitated in the manner above described a fraction of this organic material which is present in waste black liquors, and if at no time we allowed the solution to become acid, i. e., to reach a pH lower than 7.0, the fraction obtained consistently possessed the desired properties when it was incorporated in the negative plate of a storage battery. We also ascertained that by precipitating the residual material from the filtrate by the addition of more acid, this residual material varied considerably in its properties when it was incorporated in the negative plate of a storage battery. At times it proved to be suitable for use in a battery, but often it contained undesirable materials which rendered it decidedly unsuited for use in a storage battery.

While the description of our invention thus far presented has referred to the use of waste liquors of the soda or kraft processes as a source for obtaining our improved battery expander, it is to be understood that this has been done because of the economy involved in employing such waste liquors. Our invention has general application to the treatment of alkaline solutions of wood and woody materials from whatever source derived and resides in the discovery that by precipitating a selective fraction only of the organic matter by lowering the alkalinity of the solution to a point not below a pH of 7.0 and preferably between about 10.0 and about 7.0 there is prevented the precipitation of the deleterious substances responsible for the inconsistent performance in storage batteries of expanders of the prior art.

We have also determined that apparently the method of altering the pH of the solution is not important to obtaining the proper characteristics of the organic material. The importance lies in the pH itself. If, for instance, the pH is allowed to reach 3.5, decidedly on the acid side, as it does when the entire organic material is precipitated with a mineral acid, the product gives inconsistent results. The fraction precipitated from an alkaline solution in accordance with the present invention differs somewhat in its general properties from the fraction which remains in solution and which may be precipitated from acid solutions. In general, the former material is insoluble in water and in dilute acids but is readily soluble in dilute alkalies. Being of a ligneous nature, its composition is incapable of exact chemical definition, and it can only be described as being the selective product of the method of preparation hereinabove set forth.

To illustrate the manner of practice of our invention, we now offer the following example:

1,600 c. c. of waste sulfate kraft liquor solution of 16° Bé. was diluted with 400 c. c. of water to give a solution of 13° Bé. This solution was heated to a temperature of between 85° to 90° C. and then 200 c. c. of solution containing 100 grams of ammonium sulfate was added slowly, approximately one hour being taken for this addition. When the equivalent of 40 grams of ammonium sulfate had been added a precipitate appeared. Following the addition of the ammonium sulfate solution, the temperature of the entire solution was maintained at between 85° to 90° C. for a period of about three hours at the end of which time the odor of escaping ammonia was no longer evident. A voluminous precipitate had formed and at the end of this time the pH was 9.1. The precipitate was filtered and washed with dilute sulfuric acid until free from soda, after which it was then washed with water until the filtrate was neutral. The filter cake was then dried and ground and weighed 124 grams.

The yield of the organic matter in the present example was about 62%, since the organic matter contained in the quantity of waste sulfate liquor used was found to have been 200 grams.

About 0.5 of a pound of this dried organic product was then added to 100 lbs. of litharge and thoroughly mixed together with 0.5 lb. of blanc fixe and 0.25 lb. of lamp black in a mixing machine such as is usually employed for this purpose. This mixture was then made into a paste in the usual manner by adding about 5,000 c. c. of water and 3,000 c. c. of sulfuric acid of a specific gravity of about 1.250 and the mixing continued until the reaction was complete. The plastic active material was then pasted into grids, assembled in the usual manner into a battery and employed as the negative plate.

It is to be understood that the percentage of the precipitated substance used as an organic expander to be incorporated with the oxide mixture to form the improved negative plate material may vary between wide limits. While it has been found that from about 0.1% to about 1% of the compound may be used, the preferred range will usually be between about 0.2% to about 0.75% by weight of the litharge. Furthermore, details of making the paste may be varied to suit the needs of the battery manufacturer. It is to be further understood that by the term litharge, we mean to include a litharge composed of lead oxide which may contain up to 55% of finely divided metallic lead or which may contain amounts of so-called lead sub-oxide.

The foregoing description and example of our present invention, and the terms therein employed have been intended merely for illustrative purposes and no undue limitations should be deduced therefrom. It is to be understood, therefore, that variations and changes capable of being accomplished by the mere exercise of skill of the art are to be embraced within the scope of the appended claims.

We claim:

1. A process of making an expander for storage battery plates which comprises partially neutralizing an alkaline lignin containing solution derived from wood to an alkalinity within a range from upwards of pH=7.0 to about pH=10 separating from the supernatant liquor the ligneous substance thereby precipitated in the alkaline phase and washing and drying the same.

2. A process of making an expander for storage battery plates which comprises adding to an alkaline lignin containing solution derived from wood a neutralizing agent to reduce the alkalinity of such solution to within a range from upwards of pH=7.0 to about pH=10.0, separating from the supernatant liquor the ligneous substance thereby precipitated in the alkaline phase, and washing and drying the same.

3. Process according to claim 1 wherein the alkaline containing solution is waste soda liquor derived from the manufacture of paper.

4. Process according to claim 1 wherein the alkaline containing solution is an aqueous solution of black ash derived from the manufacture of paper.

5. A process of making an expander for storage battery plates which comprises partially neutralizing an alkaline lignin containing solution derived from wood to an alkalinity of about pH=9.0, separating from the supernatant liquor the ligneous substance thereby precipitated in the alkaline phase, and washing and drying the same.

6. Active material for storage battery plates comprising lead oxide having incorporated therewith between about 0.1% and about 2.0% of a ligneous substance obtained according to the method of claim 1.

7. A paste for negative plates of storage batteries comprising lead oxide having incorporated therewith between about 0.1% and about 2.0% of a ligneous substance obtained according to the method of claim 1.

ALEXANDER STEWART.
ADRIAN R. PITROT.